United States Patent [19]
Able

[11] Patent Number: 5,465,527
[45] Date of Patent: Nov. 14, 1995

[54] LANDSCAPING BORDER

[75] Inventor: Lyvonne Able, Columbia, S.C.

[73] Assignee: Able Corporation, Columbia, S.C.

[21] Appl. No.: 378,632

[22] Filed: Jan. 26, 1995

[51] Int. Cl.$^6$ ..................................................... A01G 1/08
[52] U.S. Cl. .................... 47/33; 47/1.01; 405/25
[58] Field of Search ................ 47/1.01, 1 F, 56, 47/33; 405/25

[56]  References Cited

U.S. PATENT DOCUMENTS

| | | | |
|---|---|---|---|
| 1,554,865 | 9/1925 | Magoon | 47/26 |
| 1,721,228 | 7/1929 | Marden . | |
| 1,841,591 | 1/1932 | Adams | 47/9 |
| 2,071,779 | 2/1937 | Willing . | |
| 3,857,195 | 12/1974 | Johnson | 47/32 |
| 4,105,431 | 8/1978 | Lewis et al. | 71/67 |
| 4,239,824 | 12/1980 | Kasten | 428/13 |
| 4,317,309 | 3/1982 | Sheldon | 47/32 |
| 4,627,191 | 12/1986 | Bergere | 47/25 |
| 5,338,131 | 8/1994 | Bestman | 405/24 |

FOREIGN PATENT DOCUMENTS

| | | | |
|---|---|---|---|
| 45-5418 | 2/1970 | Japan | 47/1 F |
| 126613 | 9/1980 | Japan | 47/1 F |
| 48961 | 11/1984 | Japan | 47/1 F |
| 173211 | 9/1985 | Japan | 47/56 |
| 403290525 | 12/1991 | Japan | 47/56 |
| 2115697 | 9/1983 | United Kingdom | 47/25 R |
| 86/02804 | 5/1986 | WIPO | 47/56 |

Primary Examiner—Henry E. Raduazo
Attorney, Agent, or Firm—Joseph T. Guy, Jr.

[57] ABSTRACT

A landscaping border is provided which is attractive, safe for animals and children to play around and less susceptible to biological growth. Provided is a landscaping border comprising: a tubular polyethylene mesh with a mesh size of at least about 0.25 inches and no more than about 3 inches and a diameter of at least about 3 inches and no more than about 10 inches; biodegradable ground cover, preferably pine straw, wherein at least 95% of the weight of the biodegradable ground cover is contained within the mesh and no more than about 5% of the total weight of the biodegradable ground cover protrudes through said mesh. The inventive border also preferably comprises a biocide.

18 Claims, 1 Drawing Sheet

LANDSCAPING BORDER

BACKGROUND OF THE INVENTION

This invention is generally related to a landscaping border which is attractive, easily installed and less susceptible to problems associated with mold and mildew.

Landscape architecture is widely employed as a means of enjoyment and as a method for improving the appearance of surroundings. One common form of landscape improvement is to lay a ground cover of biodegradable material around the base of ornamental plants and trees. The biodegradable material forms a thick mat which discourages unwanted grasses and weeds from growing within the bed of ornamental plants and trees. Pine straw has been demonstrated as a particularly suitable material since the degradation is relatively slow and the appearance is pleasing.

A major point of discouragement with a ground cover is the common occurrence of migration out of the intended location and into the adjoining area. This migration of material causes the borders to become ill defined and causes an undesirable loss of material from within the confines of the ornamental flower bed. There has long been a desire for a method of containing the ground cover within a predetermined area while still maintaining the appearance of a defined border.

Wire mesh has been employed for encasing biodegradable material. Bestmann, U.S. Pat. No. 5,338,131 teaches the use of a heavy mesh with aquatic plants therein for stabilizing a bank. The mesh material must be strong enough to avoid destruction from the constant motion of the water. Willing, U.S. Pat. No. 2,071,779 teaches a wire mesh tube comprising hooks on the exterior thereof for filling in holes and the like. The inventions of Bestman and Willig are suitable for placing in environments where visual appeal is not a concern. Bestman is specifically detailed for use in or under water. Willing is intended specifically for applications wherein the entire apparatus is buried under dirt or other materials.

An ornamental border must be visually pleasing and the most stringent of architects require the visual appearance to be completely natural. A wire mesh, or heavy line mesh draws attention away from the ornamental flowers which is undesirable. Also, wire mesh frequently comprises sharp areas and tends to rust which is undesirable in yards where children may be present. Yet another problem with wire mesh is the difficulty associated with removing the mesh from the area after the material contained therein has decomposed. A wire mesh shell remains which must be removed. Typically the wire mesh shell is partly buried under sediment and becomes rather unsightly. The instant invention provides a border which visually blends with the surrounding ground cover and is essentially invisible due to the construction thereof.

Yet another problem with a border material is the formation of mold, mildew and the like. This is particularly prevalent when a biodegradable material is packed tightly and susceptible to moisture. An adequate border material will slow the flow of water and therefore act somewhat as a dam. The border material remains damp for long periods of time which facilitates the formation of molds, mildews and the like. It is most desirable to provide a border for ornamental flower beds which is less susceptible to formation of molds and mildews. The biocide is preferably colorless such that the natural color of the border is not altered. The biocide must also be easily handled in large quantities with minimal cost of manufacture. Since the biocide is in an area frequented by animals and people it is most preferred that the biocide exhibit a low toxicity. The biocide must also be active for a reasonable length of time. These conflicting criteria are difficult to achieve and a compromise must frequently be made.

SUMMARY OF THE INVENTION

It is an object of the present invention to provide a border for ornamental flower beds which is attractive and functional.

It is another object of the present invention to provide a border which is not susceptible to rust.

It is another object of the present invention to provide a border which is not a danger to children and animals playing in the vicinity of the border.

A particular feature provided by the present invention is the visual appearance which is created wherein the container is not visually apparent.

It is also an object of the present invention to provide a border which is less susceptible to biological growth.

These and other advantages, as will be apparent from the description, are provided in a landscaping border consisting essentially of: a tubular polyethylene mesh with a diameter of at least about 3 inches and no more than about 10 inches; biodegradable ground cover wherein at least 80% of the total weight of the biodegradable ground cover is contained within the tubular polyethylene mesh and no more than about 20% of the total weight of the biodegradable ground cover protrudes through the mesh; and a biocide.

A particularly preferred embodiment is provided in a landscaping border comprising: a tubular polyethylene mesh; biodegradable ground cover wherein at least 80% of the total weight of the biodegradable ground cover is contained within the tubular polyethylene mesh and no more than 20% of the total weight of the biodegradable ground cover protrudes through the mesh; a biocide of formula:

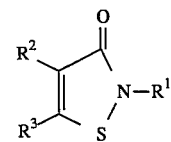

wherein
- $R^1$ is an unsubstituted or substituted alkyl, alkenyl, or alkynyl group of 1 to 18 carbon atoms, an unsubstituted or substituted cycloalkyl group having a 3 to 12 carbon atom ring, an unsubstituted or substituted aralkyl group of up to 10 carbon atoms, or an unsubstituted or substituted aryl group of up to 10 carbon atoms; preferably 4 to 18 carbon atoms;
- $R^2$ is hydrogen, halogen, a substituted or unsubstituted alkyl group of 1 to 4 carbons; and
- $R^3$ is hydrogen, halogen, a substituted or unsubstituted alkyl group of 1 to 4 carbons.

Yet another preferred embodiment is provided in a landscaping border comprising: a tubular polyethylene mesh with a mesh size of at least about 0.25 inches and no more than about 3 inches and a diameter of at least about 3 inches and no more than about 10 inches.; pine straw wherein at least 95% of the total weight of the pine straw is contained within the tubular polyethylene mesh and no more than 5% of the total weight of the pine straw protrudes through said mesh.

DETAILED DESCRIPTION OF THE INVENTION

Figure 1:
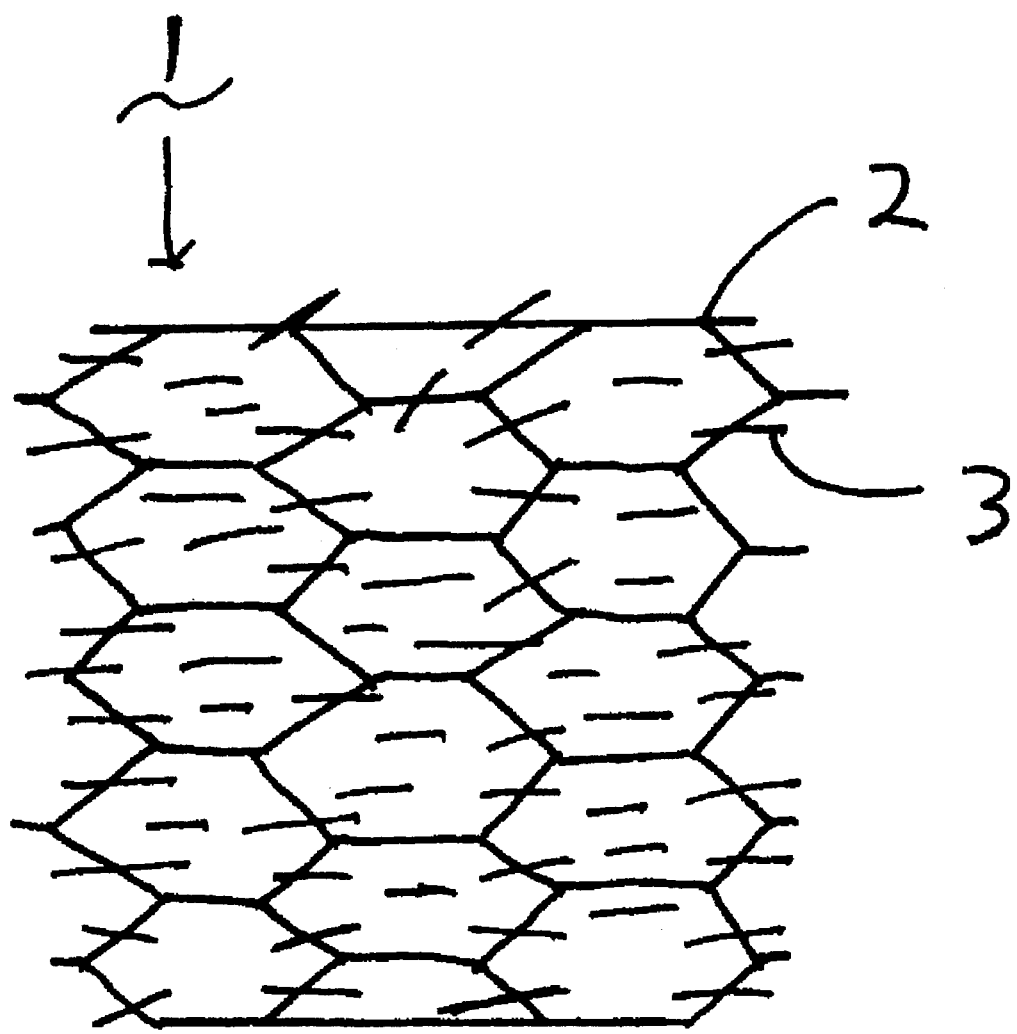
FIG. 1 is an illustration of the inventive landscaping border of the present invention.

Throughout the following description similar elements are numbered accordingly.

FIG. 1 illustrates a section of landscaping border generally referred to at 1. The mesh tube, 2, is fine tubular mesh of polyethylene, or string which is preferably dyed the same color as the biodegradable ground cover. The fine mesh forms a tube within which the biodegradable ground cover, 3, is in a tightly packed arrangement. The term "biodegradable ground cover" refers to at least one of the typical ground covers chosen from the set consisting of pine straw, oak straw, wheat straw, hay, tree bark, excelsior, cypress mulch, and eucalyptus mulch. Pine bark, oak bark, and pine straw are preferred. Most preferred is pine straw since it is a widely used ground cover and since the shape of pine straw will cause the ends to easily protrude outside of the confines of the mesh tube. The protruding biodegradable ground cover obscures the mesh from view which increases the visual appeal of the landscaping border. Preferably, the biodegradable ground cover is predominantly within the confines of the mesh with only a minor fraction of the biodegradable ground cover extending through the mesh. Preferably, at least about 80% of the total weight of the biodegradable ground cover is contained within mesh and no more than about 20% of the total weight of the biodegradable ground cover protrudes through the mesh. More preferably at least about 90% of the total weight of the biodegradable ground cover is contained within the mesh and no more than about 10% of the total weight of the biodegradable ground cover protrudes through the shell. More preferably at least about 95% of the total weight of the biodegradable ground cover is contained within the mesh and no more than about 5% of the total weight of the biodegradable ground cover protrudes through the shell. Most preferably at least about 97% of the total weight of the biodegradable ground cover is contained within the mesh and no more than about 3% of the total weight of the biodegradable ground cover protrudes through the shell. Most preferably no more than about 99% of the total weight of the biodegradable ground cover is contained within the mesh and no less than about 1% of the total weight of the biodegradable ground cover protrudes through the shell.

The term "protrudes through the shell" or the equivalent thereof refers to the particles of biodegradable ground cover which comprise both regions which are within the confines of the mesh and regions which are outside the confines of the mesh. The weight is that weight which is exterior to the mesh.

The term "fine mesh" refers to the mesh size and is defined as the longest cross section of the hole in the mesh. The mesh size is preferably at least about 0.25 inches and no more than about 3 inches. More preferably the mesh size is at least about 0.5 inches and no more than about 1.5 inches. Most preferably the mesh size is at least about 0.5 inches and no more than about 1.0 inch. The mesh size is chosen such that the amount of biodegradable ground cover protruding through the mesh is within the preferred embodiments.

The landscaping border is flexible to accommodate the shape and contour of the area covered. As the biodegradable ground cover decomposes the border collapses and therefore the mesh is not visually apparent to the casual observer. As the biodegradable ground cover decomposes the mesh collapses and another border may be placed directly on top of the previous border to continue the containment of the ground cover in the ornamental flower bed.

The border is preferably about 3 inches to about 16 inches in diameter. A border which is larger than about 16 inches becomes difficult to work with and a border with a diameter of smaller than about 3 inches does not provide the necessary protection from ground cover migration. More preferred is a diameter of about 6 inches to about 10 inches. A diameter of about 6 inches to about 10 inches is the optimal size considering both the efficiency with which ground cover migration is minimized and the efficiency with which the border can be manufactured and shipped at reasonable expense. The diameter is defined as the diameter of a perfectly round tube with an identical circumference to the border.

The border may be any length desirable and can be sold as a roll. The length is easily adjusted by cutting to size. In practice a roll of border would be laid in place and cut off as desired. Sealing the ends is not necessary but a string can be used to knit the end closed if desired.

It is most desirable to protect the border from mildew or bacteria growth. Preferably, a biocide is added to the border which is capable of mitigating the growth of mildew and bacteria. The biocide is preferably colorless such that the natural color of the border is not altered. The biocide must also be easily handled in large quantities with minimal cost of manufacture. Since the biocide is in an area frequented by animals and people it is most preferred that the biocide exhibit a low toxicity. The biocide must also be active for a reasonable length of time. These conflicting criteria are difficult to achieve and a compromise must frequently be made.

A biocide which meets many of the demands of such an application is provided in a compound of Formula 1:

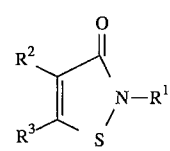

Formula 1 wherein $R^1$ is an unsubstituted or substituted alkyl, alkenyl, or alkynyl group of 1 to 18 carbon atoms, an unsubstituted or substituted cycloalkyl group having a 3 to 12 carbon atom ring, an unsubstituted or substituted aralkyl group of up to 10 carbon atoms, or an unsubstituted or substituted aryl group of up to 10 carbon atoms; $R^2$ is hydrogen, halogen, or a substituted or unsubstituted alkyl group of 1 to 4 carbons; and $R^3$ is hydrogen, halogen, a substituted or unsubstituted alkyl group of 1 to 4 carbons.

By a substituted alkyl group is meant an alkyl group having one or more of its hydrogen atoms replaced by another substituent group. Examples of the substituted alkyl groups which characterize 3-isothiazolones of Formula 1 include hydroxyalkyl, haloalkyl, cyanoalkyl, alkylaminoalkyl, dialkylaminoalkyl, arylaminoalkyl, carboxyalkyl, carbalkoxyalkyl, alkoxyalkyl, aryloxyalkyl, alkylthioalkyl, arylthioalkyl, haloalkoxyalkyl, cycloalkylaminoalkyl, such as morpholinoalkyl, piperidinoalkyl, pyrrolidonylalkyl, and the like, carbomoxyalkyl, alkenyl, haloalkenyl, alkynyl, haloalkynyl, isothiazolonylalkyl, and the like.

By a substituted aralkyl group is meant an aralkyl group having one or more of the hydrogen atoms on either the aryl ring or the alkyl chain replaced by another substituent group. Examples of the substituted aralkyl groups which characterize 3-isothiazolones of Formula 1 include halogen-, lower alkyl- of 1 to 4 carbons, or lower alkoxy-substituted aralkyl groups, and the like.

By substituted aryl group is meant an aryl group such as benzene, naphthalene, or pyridine, having one or more of the hydrogen atoms on the aryl ring replaced by another substituent group. Examples of such substituent groups include halogen, nitro, lower alkyl of 1 to 4 carbons, lower alkylacylamino of 1 to 4 carbons, lower carbalkoxy of 1 to 4 carbons, sulfamyl, and the like.

The isothiazolones described above can form novel acid salts which also exhibit biocidal activity. Preparation of these biocidally active salts is readily achieved by reacting the 3-isothiazolone with a strong inorganic or organic acid. Typically strong acids include hydrochloric, nitric, sulfuric, hydrobromic, chlorosulfonic, chloroacetic, oxalic, maleic, succinic, p-toluenesulfonic and the like. Separation of the acid salts from the reaction medium is accomplished by any convenient means known to one skilled in the art.

Representative $R^1$ substituents include methyl, ethyl, propyl, isopropyl, butyl, hexyl, octyl, decyl, pentadecyl, octadecyl, cyclopropyl, cyclohexyl, benzyl, 3,4-dichlorobenzyl, 4-methoxybenzyl, 4-chlorobenzyl, 3,4-dichlorophenyl, hydroxymethyl, chloromethyl, chloropropyl, diethylaminoethyl, cyanoethyl, carbomethoxyethyl, ethoxyethyl, 2-methoxy-1-bromoethyl, 3,3,5-trimethylcyclohexyl, phenoxyethyl, p-chloroanilinomethyl, phenylcarbamoxymethyl, allyl, propynyl, vinyl, carboxyethyl, 1-isothiazolonylethyl, and 1,2,2-trichlorovinyl.

Representative $R^2$ substituents include hydrogen, bromo, chloro, iodo, methyl, ethyl, propyl, isopropyl, butyl, and t-butyl.

Representative $R^3$ substituents include hydrogen, chloro, bromo, iodo, methyl, ethyl, propyl, isopropyl, butyl, t-butyl, chloromethyl, chloropropyl, bromomethyl, bromoethyl and bromopropyl.

Particularly preferred compounds represented by Formula 1 are:
2-propyl-3-isothiazolone,
2-butyl-3-isothiazolone,
2-t-octyl-3-isothiazolone,
2-decyl-3-isothiazolone,
2-octyldecyl-3-isothiazolone,
2-cylcohexyl-3-isothiazolone,
4-chloro-2-methyl-3-isothiazolone,
4-bromo-2-methyl-3-isothiazolone,
5-chloro-2-methyl-3-isothiazolone,
5-chloro-2,4-dimethyl-3-isothiazolone,
4-bromo-5-chloro-2-methyl-3-isothiazolone,
4-bromo-2-cyclohexyl-3-isothiazolone,
4,5-dichloro-2-ethyl-3-isothiazolone,
4-methyl-2-octyl-3-isothiazolone,
4,5-dimethyl-2-octyl-3-isothiazolone,
2-benzyl-3-isothiazolone,
2-benzyl-4,5-dichloro-3-isothiazolone,
2-benzyl-5-chloro-3-isothiazolone,
2-(2',4'-dichlorobenzyl)-3-isothiazolone,
2-(4'-methoxybenzyl)-3-isothiazolone,
2-(4'-ethylbenzyl)-3-isothiazolone,
2-(3',4'-dichlorophenyl)-3-isothiazolone,
2-(3',4'-dichlorophenyl)-4-methyl-3-isothiazolone,
2-(2-cyanoethyl)-3-isothiazolone,
2-(2-carbomethoxyethyl)-3-isothiazolone,
2-carbomethoxymethyl-3-isothiazolone,
2-(2-ethoxyethyl)-3-isothiazolone,
2-(3',4',5'-trimethylcyclohexyl)-3-isothiazolone,
2-(2-phenoxyethyl)-3-isothiazolone,
2-(2-methoxyethyl)-3-isothiazolone,
2-(3',4'-dichloroanilinomethyl)-3-isothiazolone,
2-(4'-chloroanilinomethyl)-3-isothiazolone,
2-(4'-nitroanilinomethyl)-3-isothiazolone,
2-morpholinomethyl-3-isothiazolone,
2-piperidinomethyl-3-isothiazolone,
2-phenylcarbamoxymethyl-3-isothiazolone,
2-(3'-chlorophenylcarbamoxymethyl)-3-isothiazolone,
2-(3',4'-dichlorophenylcarbamoxymethyl)-3-isothiazolone,
2-allyl-3-isothiazolone,
2-propynyl-3-isothiazolone,
2-vinyl-3-isothiazolone,
5-chloro-2-vinyl-3-isothiazolone,
2-methoxymethyl-3-isothiazolone,
2-(2-carboxyethyl)-3-isothiazolone,
2-(2-carb-n-butoxyethyl)-3-isothiazolone,
2-[1-(N-pyrrolidonyl)ethyl]-3-isothiazolone,
2-[1-(N-isothiazolonyl)ethyl]-3-isothiazolone,
2-(1,2,2-trichlorovinyl)-3-isothiazolone,
2-(1-bromo-2-methoxyethyl)-3-isothiazolone,
2-(2-chloroethyl)-3-isothiazolone,
2-(3-chloropropyl)-3-isothiazolone,
2-cyclopropyl-3-isothiazolone,
2-[2-(4'-chlorophenyl)ethyl]-3-isothiazolone,
2-n-hexyl-3-isothiazolone,
2-n-heptyl-3-isothiazolone,
2-cyclopentyl-3-isothiazolone,
2-(4'-chlorophenyl)-3-isothiazolone,
2-(2',4'-dichlorophenyl)-3-isothiazolone,
2-(2',3'-dichlorophenyl)-3-isothiazolone,
2-(2',5'-dichlorophenyl)-3-isothiazolone,
2-(3'-chlorophenyl)-3-isothiazolone,
2-phenyl-3-isothiazolone,
2-(2'-chlorophenyl)-3-isothiazolone,
2-n-pentyl-3-isothiazolone,
2-i-propyl-3-isothiazolone,
2-(2-hydroxyethyl)-3-isothiazolone,
2-(2-bromoethyl)-3-isothiazolone,
2-(1,2,2,2-tetrachloroethyl)-3-isothiazolone,
2-chloromethyl-3-isothiazolone,
2-(2-dimethylaminoethyl)-3-isothiazolone,
4,5-dichloro-2-t-octyl-3-isothiazolone,
4-chloro-2-n-octyl-3-isothiazolone,
4-bromo-2-n-octyl-3-isothiazolone,
4-bromo-2-(4'-chlorophenyl)-3-isothiazolone,
4-bromo-2-t-butyl-3-isothiazolone,
2-(2,2,2-trichloro-1-hydoxyethyl)-3-isothiazolone,
2-(2,2,2-tribromo-1-hydoxyethyl)-3-isothiazolone,
2-trichlorobenzyl-3-isothiazolone,
2-sec-butyl-3-isothiazolone,
4-methyl-2-isopropyl-3-isothiazolone,
2-(4'-methylphenyl)-3-isothiazolone,
2-hydroxymethyl-3-isothiazolone,
2-[2-(N,N-diethylamino)ethyl]-3-isothiazolone.

The isothiazolones except hydroxyalkyl, alkenyl and alkynyl derivatives can be prepared by the cyclization of a substituted disulfideamide having the general formula

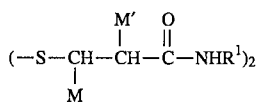

wherein M and M' are hydrogen or lower alkyl and $R^1$ is as defined for Formula 1 except alkenyl, alkynyl, and lower hydroxyalkyl groups. The cyclization is accomplished by reacting the disulfide-amide with a halogenating agent. Any halogenating agent may be employed in this reaction. Typical halogenating agents include chlorine, bromine, sulfuryl chloride, sulfuryl bromide, N-chlorosuccinimide, N-bromosuccinimide, iodine monochloride, and the like. Cyclization of the disulfide-amide will take place when 3 mole equivalents of halogenating agent are employed in the reaction. By providing an excess of halogenating agent, the isothiazolone may be halogenated at the 4- and/or 5-positions for Formula 1. Where 5 mole equivalents of halogenating agent are available, mono-halogenation can take place. For di-halogenation, 7 mole equivalents of halogenating agent are required. Preparation of isothiazolones having the 4- and 5-positions substituted with different halogens is achieved by the halogenation of an isothiazolone already halogenated at one of the two positions. For example, if a 4-bromo-5-chloro-3-isothiazolone is desired, it can be obtained by bromination of a 5-chloro-3-isothiazolone. The starting 3-isothiazolone is prepared by the cyclization of a disulfide-amide as described above. The cyclization process will proceed over a broad temperature range and temperature is not critical to the reaction. Generally, the cyclization will be carried out in the range of 0° to 100° C. The reaction is carried out in an inert non-aqueous solvent, such as, for example benzene, toluene, xylene, ethyl acetate, or ethylene dichloride. In addition, the 4,5-dihalo-3-isothiazolones may be prepared by in situ halogenation of a 5-halo-3-isothiazolone.

In addition, isothiazolones can be prepared as described in Chem. Ber., 96, 944–954 (1963); or as described by Crow and Leonard, in Journal of Organic Chemistry, 30, 2660–2665 (1965). Other preparative techniques for compounds represented by Formula 1 are detailed in U.S. Pat. 4,105,431 the details of which are included herein by reference thereto.

The inventive landscaping border is prepared by hand packing, blowing the biodegradable ground cover into the mesh tube or by gravity feed from a hopper. The border is typically laid in place and cut to length with scissors, or the like. The same biodegradable ground cover employed in the border is preferably placed in the bed with some slightly covering the border.

Biocide is added to the border by dipping or spraying. In a manufacturing environment it is most preferably to dip the border by transporting the border through a container with a solution of biocide. The biocide can also be sprayed onto the border which is advantageous after the border has been placed.

I claim:

1. A landscaping border consisting essentially of:
   a tubular polyethylene mesh with a diameter of at least about 3 inches and no more than about 10 inches;
   biodegradable ground cover wherein at least 80% of the total weight of said biodegradable ground cover is contained within said tubular polyethylene mesh and no more than 20% of said total weight of said biodegradable ground cover protrudes through said mesh;
   a biocide.

2. The landscaping border of claim 1 wherein said biodegradable ground cover is chosen from the set consisting of pine straw, oak straw, wheat straw, hay, tree bark, excelsior, cyprus mulch, and eucalyptus mulch.

3. The landscaping border of claim 1 wherein at least 95% of the total weight of said biodegradable ground cover is contained within said mesh and no more than 5% of said total weight of said biodegradable ground cover protrudes through said mesh.

4. The landscaping border of claim 1 wherein said biocide is:

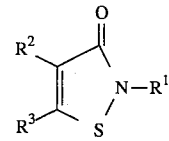

wherein

R1 is an unsubstituted or substituted alkyl, alkenyl, or alkynyl group of 1 to 18 carbon atoms, an unsubstituted or substituted cycloalkyl group having a 3 to 12 carbon atom ring, an unsubstituted or substituted aralkyl group of up to 10 carbon atoms, or an unsubstituted or substituted aryl group of up to 10 carbon atoms; preferably 4 to 18 carbon atoms;

R2 is hydrogen, halogen, a substituted or unsubstituted alkyl group of 1 to 4 carbons; and R3 is hydrogen, halogen, a substituted or unsubstituted alkyl group of 1 to 4 carbons.

5. The landscaping border of claim 4 wherein said biocide is chosen from the set consisting of: 2-propyl-3-isothiazolone, 2-butyl-3-isothiazolone, 2-t-octyl-3-isothiazolone, 2-decyl-3-isothiazolone, 2-octyldecyl-3-isothiazolone, 2-cylcohexyl-3-isothiazolone, 4-chloro-2-methyl-3-isothiazolone, 4-bromo-2-methyl-3-isothiazolone, 5-chloro-2-methyl-3-isothiazolone, 5-chloro-2,4-dimethyl-3-isothiazolone, 4-bromo-5-chloro-2-methyl-3-isothiazolone, 4-bromo-2-cyclohexyl-3-isothiazolone, 4,5-dichloro-2-ethyl-3-isothiazolone, 4-methyl-2-octyl-3-isothiazolone, 4,5-dimethyl-2-octyl-3-isothiazolone, 2-benzyl-3-isothiazolone, 2-benzyl-4,5-dichloro-3-isothiazolone, 2-benzyl-5-chloro-3-isothiazolone, 2-(2',4'-dichlorobenzyl)-3-isothiazolone, 2-(4'-methoxybenzyl)-3-isothiazolone, 2-(4'-ethylbenzyl)-3isothiazolone, 2-(3',4'-dichlorophenyl)-3-isothiazolone, 2-(3',4'-dichlorophenyl)-4-methyl-3-isothiazolone, 2-(2-cyanoethyl)-3-isothiazolone, 2-(2-carbomethoxyethyl)-3-isothiazolone, 2-carbomethoxymethyl-3-isothiazolone, 2-(2-ethoxyethyl)-3-isothiazolone, 2-(3',4', 5'-trimethylcyclohexyl)-3-isothiazolone, 2-(2-phenoxyethyl)-3-isothiazolone, 2-(2-methoxyethyl)-3-isothiazolone, 2-(3',4'-dichloroanilinomethyl)-3-isothiazolone, 2-(4'-chloroanilinomethyl)-3-isothiazolone, 2-(4'-nitroanilinomethyl)-3-isothiazolone, 2-morpholinomethyl-3-isothiazolone, 2-piperidinomethyl-3-isothiazolone, 2-phenylcarbamoxymethyl-3-isothiazolone, 2-(3'-chlorophenylcarbamoxymethyl)-3-isothiazolone, 2-(3',4'-dichlorophenylcarbamoxymethyl)-3-isothiazolone, 2-allyl-3-isothiazolone, 2-propynyl-3-isothiazolone, 2-vinyl-3-isothiazolone, 5-chloro-2-vinyl-3-isothiazolone, 2-methoxymethyl-3-isothiazolone, 2-(2-carboxyethyl)-3-isothiazolone, 2-(2-carb-n-butoxyethyl)-3-isothiazolone, 2-[1-(N-pyrrolidonyl)ethyl]-3-isothiazolone, 2-[1-(N-isothiazolonyl)ethyl]-3-isothiazolone, 2-(1,2,2-trichlorovinyl)-3-isothiazolone, 2-(1-bromo-2-methoxyethyl)-3- isothiazolone, 2-(2-chloroethyl)-3isothiazolone, 2-(3-chloropropyl)-3-isothiazolone, 2-cyclopropyl-3-isothiazolone, 2-[2-(4'-chlorophenyl)ethyl]-3-isothiazolone, 2-n-hexyl-3-isothiazolone, 2-n-heptyl-3-isothiazolone, 2-cyclopentyl-3-isothiazolone, 2-(4'-chlorophenyl)-3-isothiazolone, 2-(2',4'-dichlorophenyl)-3-isothiazolone, 2-(2',3'-dichlorophenyl)-3-isothiazolone, 2-(2',5'-dichlorophenyl)-3-isothiazolone, 2-(3'-chlorophenyl)-3-isothiazolone, 2-phenyl-3-isothiazolone, 2-(2'-chlorophenyl)-3-isothiazolone, 2-n-pentyl-3-isothiazolone, 2-i-propyl-3-isothiazolone, 2-(2-hydroxyethyl)-3-isothiazolone, 2-(2-bromoethyl)-3-isothiazolone, 2-(1,2,2,2-tetrachloroethyl)-3-isothiazolone, 2-chloromethyl-3-isothiazolone, 2-(2-dimethylaminoethyl)-3-isothiazolone, 4,5-dichloro-2-t-octyl-3-isothiazolone, 4-chloro-2-n-octyl-3-isothiazolone, 4-bromo-2-n-octyl-3-isothiazolone, 4-bromo-2-(4'-chlorophenyl)-3-isothiazolone, 4-bromo-2-t-butyl-3-isothiazolone, 2-(2,2,2-trichloro-1-hydoxyethyl)-3-isothiazolone, 2-(2,2,2-tribromo-1-hydoxyethyl)-3-isothiazolone, 2-trichlorobenzyl-3-isothiazolone, 2-sec-butyl-3-isothiazolone, 4-methyl-2-isopropyl-3-isothiazolone, 2-(4'-methylphenyl)-3-isothiazolone, 2-hydroxymethyl-3-isothiazolone, and 2-[2-(N,N-diethylamino)ethyl]-3-isothiazolone.

6. The landscaping border of claim 1 wherein said tubular polyethylene mesh has a diameter of at least about 6 inches and no more than about 10 inches.

7. The landscaping border of claim 1 wherein said tubular polyethylene mesh has a mesh size of at least about 0.25 inches and no more than about 3 inches.

8. The landscaping border of claim 1 wherein said tubular polyethylene mesh has a mesh size of at least about 0.5 inches and no more than about 1 inches.

9. The landscaping border of claim 1 wherein no more than 99% of the total weight of said biodegradable ground cover is contained within said mesh and no less than 1% of said total weight of said biodegradable ground cover protrudes through said mesh.

10. A landscaping border comprising:
a tubular polyethylene mesh;
biodegradable ground cover wherein at least 80% of the total weight of said biodegradable ground cover is contained within said tubular polyethylene mesh and no more than 20% of said total weight of said biodegradable ground cover protrudes through said mesh;
a biocide of formula:

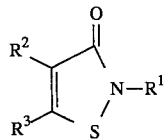

wherein
R1 is an unsubstituted or substituted alkyl, alkenyl, or alkynyl group of 1 to 18 carbon atoms, an unsubstituted or substituted cycloalkyl group having a 3 to 12 carbon atom ring, an unsubstituted or substituted aralkyl group of up to 10 carbon atoms, or an unsubstituted or substituted aryl group of up to 10 carbon atoms; preferably 4 to 18 carbon atoms;
R2 is hydrogen, halogen, a substituted or unsubstituted alkyl group of 1 to 4 carbons; and
R3 is hydrogen, halogen, a substituted or unsubstituted alkyl group of 1 to 4 carbons.

11. The landscaping border of claim 10 wherein said biodegradable ground cover is chosen from the set consisting of pine straw, oak straw, wheat straw, hay, tree bark, excelsior, cyprus mulch, and eucalyptus mulch.

12. The landscaping border of claim 10 wherein said biocide is chosen from the set consisting of:

2-propyl-3-isothiazolone, 2-butyl-3-isothiazolone, 2-t-octyl-3-isothiazolone, 2-decyl-3-isothiazolone, 2-octyl-decyl-3-isothiazolone, 2-cylcohexyl-3-isothiazolone, 4-chloro-2-methyl-3-isothiazolone, 4-bromo-2-methyl-3-isothiazolone, 5-chloro-2-methyl-3-isothiazolone, 5-chloro-2,4-dimethyl-3-isothiazolone, 4-bromo-5-chloro-2-methyl-3-isothiazolone, 4-bromo-2-cyclohexyl-3-isothiazolone, 4,5-dichloro-2-ethyl-3-isothiazolone, 4-methyl-2-octyl-3-isothiazolone, 4,5-dimethyl-2-octyl-3-isothiazolone, 2-benzyl-3-isothiazolone, 2-benzyl-4,5-dichloro-3-isothiazolone, 2-benzyl-5-chloro-3-isothiazolone, 2-(2',4'-dichlorobenzyl)-3-isothiazolone, 2-(4'-methoxybenzyl)-3-isothiazolone, 2-(4'-ethylbenzyl)-3-isothiazolone, 2-(3',4'-dichlorophenyl)-3-isothiazolone, 2-(3',4'-dichlorophenyl)-4-methyl-3 -isothiazolone, 2-(2-cyanoethyl)-3-isothiazolone, 2-(2-carbomethoxyethyl)-3-isothiazolone, 2-carbomethoxymethyl-3-isothiazolone, 2-(2-ethoxyethyl)-3-isothiazolone, 2-(3',4',5'-trimethylcyclohexyl)-3-isothiazolone, 2-(2-phenoxyethyl)-3-isothiazolone, 2-(2-methoxyethyl)-3-isothiazolone, 2-(3',4'-dichloroanilinomethyl)-3-isothiazolone, 2-(4'-chloroanilinomethyl)-3-isothiazolone, 2-(4'-nitroanilinomethyl)-3-isothiazolone, 2-morpholinomethyl-3-isothiazolone, 2-piperidinomethyl-3-isothiazolone, 2-phenylcarbamoxymethyl-3-isothiazolone, 2-(3'-chlorophenylcarbamoxymethyl)-3-isothiazolone, 2-(3',4'-dichlorophenylcarbamoxymethyl)-3-isothiazolone, 2-allyl-3-isothiazolone, 2-propynyl-3-isothiazolone, 2-vinyl-3-isothiazolone, 5-chloro-2-vinyl-3-isothiazolone, 2-methoxymethyl-3-isothiazolone, 2-(2-carboxyethyl)-3-isothiazolone, 2-(2-carb-n-butoxyethyl)-3-isothiazolone, 2-1-(N-pyrrolidonyl)ethyl]-3-isothiazolone, 2-[1-(N-isothiazolonyl)ethyl]-3-isothiazolone, 2-(1,2,2-trichlorovinyl)-3-isothiazolone, 2-(1-bromo-2-methoxyethyl)-3-isothiazolone, 2-(2-chloroethyl)-3-isothiazolone, 2-(3-chloropropyl)-3-isothiazolone, 2-cyclopropyl-3-isothiazolone, 2-[2-(4'-chlorophenyl)ethyl]-3-isothiazolone, 2-n-hexyl-3-isothiazolone, 2-n-heptyl-3-isothiazolone, 2-cyclopentyl-3-isothiazolone, 2-(4'-chlorophenyl)-3-isothiazolone, 2-(2',4'-dichlorophenyl)-3-isothiazolone, 2-(2',3'-dichlorophenyl)-3-isothiazolone, 2-(2',5'-dichlorophenyl)-3-isothiazolone, 2-(3'-chlorophenyl)-3-isothiazolone, 2-phenyl-3-isothiazolone, 2-(2'-chlorophenyl)-3-isothiazolone, 2-n-pentyl-3-isothiazolone, 2-i-propyl-3-isothiazolone, 2-(2-hydroxyethyl)-3-isothiazolone, 2-(2-bromoethyl)-3-isothiazolone, 2-(1,2,2,2-tetrachloroethyl)-3-isothiazolone, 2-chloromethyl-3-isothiazolone, 2-(2-dimethylaminoethyl)-3-isothiazolone, 4,5-dichloro-2-t-octyl-3-isothiazolone, 4-chloro-2-n-octyl-3-isothiazolone, 4-bromo-2-n-octyl-3-isothiazolone, 4-bromo-2-(4'-chlorophenyl)-3-isothiazolone, 4-bromo-2-t-butyl-3-isothiazolone, 2-(2,2,2-trichloro-1-hydoxyethyl)-3-isothiazolone, 2-(2,2,2-tribromo-1-hydoxyethyl)-3-isothiazolone, 2-trichlorobenzyl-3-isothiazolone, 2-sec-butyl-3-isothiazolone, 4-methyl-2-isopropyl-3-isothiazolone, 2-(4'-methylphenyl)-3-isothiazolone, 2-hydroxymethyl-3-isothiazolone, and 2-[2-(N,N-diethylamino)ethyl]-3-isothiazolone.

13. The landscaping border of claim 10 wherein said tubular polyethylene mesh has a diameter of at least about 3 inches and no more than about 10 inches.

14. A landscaping border comprising:

a tubular polyethylene mesh with a mesh size of at least about 0.25 inches and no more than about 3 inches and a diameter of at least about 3 inches and no more than about 10 inches;

pine straw wherein at least 95% of the weight of said pinestraw is contained within said mesh and no more than about 5% of said total weight of said pine straw protrudes through said mesh.

15. The landscaping border of claim 14 further comprising a biocide of formula:

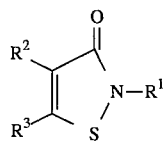

wherein

R1 is an unsubstituted or substituted alkyl, alkenyl, or alkynyl group of 1 to 18 carbon atoms, an unsubstituted or substituted cycloalkyl group having a 3 to 12 carbon atom ring, an unsubstituted or substituted aralkyl group of up to 10 carbon atoms, or an unsubstituted or substituted aryl group of up to 10 carbon atoms; preferably 4 to 18 carbon atoms;

R2 is hydrogen, halogen, a substituted or unsubstituted alkyl group of 1 to 4 carbons; and R3 is hydrogen, halogen, a substituted or unsubstituted alkyl group of 1 to 4 carbons.

16. The landscaping border of claim 15 wherein said biocide is chosen from the set consisting of:

2-propyl-3-isothiazolone, 2-butyl-3-isothiazolone, 2-t-octyl-3-isothiazolone, 2-decyl-3-isothiazolone, 2-octyldecyl-3-isothiazolone, 2-cylcohexyl-3-isothiazolone, 4-chloro-2-methyl-3-isothiazolone, 4-bromo-2-methyl-3-isothiazolone, 5-chloro-2-methyl-3-isothiazolone, 5-chloro-2,4-dimethyl-3-isothiazolone, 4-bromo-5-chloro-2-methyl-3-isothiazolone, 4-bromo-2-cyclohexyl-3-isothiazolone, 4,5-dichloro-2-ethyl-3-isothiazolone, 4-methyl-2-octyl-3-isothiazolone, 4,5-dimethyl-2-octyl-3-isothiazolone, 2-benzyl-3-isothiazolone, 2-benzyl-4,5-dichloro-3-isothiazolone, 2-benzyl-5-chloro-3-isothiazolone, 2-(2',4'-dichlorobenzyl)-3-isothiazolone, 2-(4'-methoxybenzyl)-3-isothiazolone, 2-(4'-ethylbenzyl)-3-isothiazolone, 2-(3',4'-dichlorophenyl)-3-isothiazolone, 2-(3',4'-dichlorophenyl)-4-methyl-3 -isothiazolone, 2-(2-cyanoethyl)-3-isothiazolone, 2-(2-carbomethoxyethyl)-3-isothiazolone, 2-carbomethoxymethyl-3-isothiazolone, 2-(2-ethoxyethyl)-3-isothiazolone, 2-(3',4',5'-trimethylcyclohexyl)-3-isothiazolone, 2-(2-phenoxyethyl)-3-isothiazolone, 2-(2-methoxyethyl)-3-isothiazolone, 2-(3',4'-dichloroanilinomethyl)-3-isothiazolone, 2-(4'-chloroanilinomethyl)-3-isothiazolone, 2-(4'-nitroanilinomethyl)-3-isothiazolone, 2-morpholinomethyl-3-isothiazolone, 2-piperidinomethyl-3-isothiazolone, 2-phenylcarbamoxymethyl-3-isothiazolone, 2-(3'-chlorophenylcarbamoxymethyl)-3-isothiazolone, 2-(3',4'-dichlorophenylcarbamoxymethyl)-3-isothiazolone, 2-allyl-3-isothiazolone, 2-propynyl-3-isothiazolone, 2-vinyl-3-isothiazolone, 5-chloro-2-vinyl-3-isothiazolone, 2-methoxymethyl-3-isothiazolone, 2-(2-carboxyethyl)-3-isothiazolone, 2-(2-carb-n-butoxyethyl)-3-isothiazolone, 2-[1-(N-pyrrolidonyl)ethyl]-3-isothiazolone, 2-[1-(N-isothiazolonyl)ethyl]-3-isothiazolone, 2-(1,2,2-trichlorovinyl)-3-isothiazolone, 2-(1-bromo-2-methoxyethyl)-3-isothiazolone, 2-(2-chloroethyl)-3-isothiazolone, 2-(3-chloropropyl)-3-isothiazolone, 2-cyclopropyl-3-isothiazolone, 2-[2-(4'-chlorophenyl)ethyl]-3-isothiazolone, 2-n-hexyl-3-isothiazolone, 2-n-heptyl-3-isothiazolone, 2-cyclopentyl-3-isothiazolone, 2-(4'-chlorophenyl)-3-isothiazolone, 2-(2',4'-dichlorophenyl)-3-isothiazolone, 2-(2',3'-dichlorophenyl)-3-isothiazolone, 2-(2',5'-dichlorophenyl)-3-isothiazolone, 2-(3'-chlorophenyl)-3-isothiazolone, 2-phenyl-3-isothiazolone, 2-(2'-chlorophenyl)-3-isothiazolone, 2-n-pentyl-3-isothiazolone, 2-i-propyl-3-isothiazolone, 2-(2-hydroxyethyl)-3-isothiazolone, 2-(2-bromoethyl)-3-isothiazolone, 2-(1,2,2,2-tetrachloroethyl)-3-isothiazolone, 2-chloromethyl-3-isothiazolone, 2-(2-dimethylaminoethyl)-3-isothiazolone, 4,5-dichloro-2-t-octyl-3-isothiazolone, 4-chloro-2-n-octyl-3-isothiazolone, 4-bromo-2-n-octyl-3-isothiazolone, 4-bromo-2-(4'-chlorophenyl)-3-isothiazolone, 4-bromo-2-t-butyl-3-isothiazolone, 2-(2,2,2-trichloro-1-hydoxyethyl)-3-isothiazolone, 2-(2,2,2-tribromo-1-hydoxyethyl)-3-isothiazolone, 2-trichlorobenzyl-3-isothiazolone, 2-sec-butyl-3-isothiazolone, 4-methyl-2-isopropyl-3-isothiazolone, 2-(4'-methylphenyl)-3-isothiazolone, 2-hydroxymethyl-3-isothiazolone, and 2-[2-(N,N-diethylamino)ethyl]-3-isothiazolone.

17. The landscaping border of claim 14 wherein said tubular polyethylene mesh has a diameter of at least about 6 inches and no more than about 10 inches.

18. The landscaping border of claim 14 wherein said tubular polyethylene mesh has a mesh size of at least about 0.5 inches and no more than about 1 inches.

* * * * *